March 4, 1958     J. CRAWFORD     2,825,802

BATTERY RETAINING DEVICE

Filed March 31, 1953

INVENTOR.
JOHN CRAWFORD

BY Harry M. Saragovitz
Attorney

United States Patent Office 2,825,802
Patented Mar. 4, 1958

2,825,802

BATTERY RETAINING DEVICE

John Crawford, Red Bank, N. J., assignor to the United States of America as represented by the Secretary of the Army Application March 31, 1953, Serial No. 346,057

3 Claims. (Cl. 250—14)

(Granted under Title 35, U. S. Code (1952), sec. 266)

The invention described herein may be manufactured and used by or for the Government for governmental purposes, without the payment of any royalty thereon.

The present invention relates to a retaining device particularly adapted for use in retaining and confining a component which is a part of a complete assembly of components.

In the assembly of small hand portable radio receiver and transmitter sets, the two main components or units are the radio receiver and transmitter, comprising one unit and the battery which supplies the energy for the operation of the set comprising the other. Heretofore in the assembly of such handsets, the radio unit was securely locked to the housing while the battery was merely placed in the cavity provided for and the cable lead plug of the radio unit was inserted into the battery.

It has been found that the batteries supplied for such use were not all of uniform length, and in instances where the batteries supplied were shorter than the space provided, such batteries moved about within the casing often resulting in the disconnection between the radio unit and the battery. It was also found that shifting of the battery within the housing could cause possible damage to the casing of the battery.

It is therefore a primary object of the invention to provide a retainer that will securely confine a component, such as a battery, within the space or cavity in which the battery lies.

A further object of the invention is to provide a retainer having a spring loaded support whereby components of slightly varying size can be accommodated and securely held in a space within a housing.

These and other objects and features of the invention will be more apparent from a reading of the description of the device as set forth in the specification and drawings in which.

In the description that follows the device of the subject invention will be described in relation to and its use in retaining a battery within a hand portable radio receiver and transmitter set. It is, however, to be understood that the device can have other applications such as for retaining any unsecured component in an assembly of several components.

Figure 1:
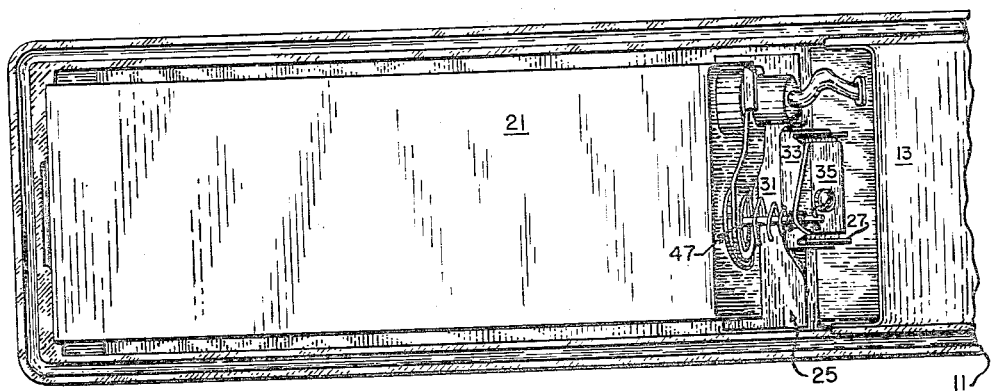
Fig. 1 is a top plan view of two components within a casing, partially shown, and the preferred form of retaining means.
Figure 2:
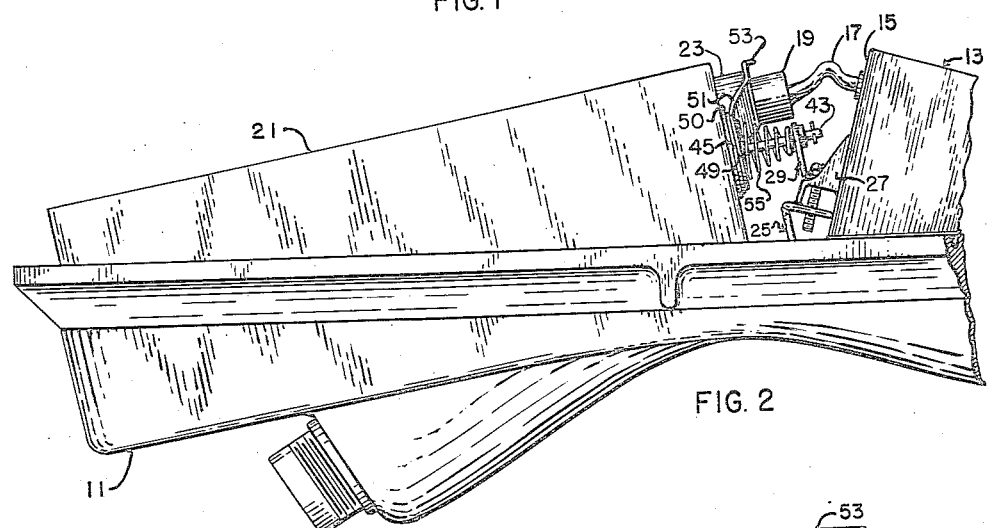
Fig. 2 is a side elevational view of the arrangement of components shown in Fig. 1.

Referring to the drawing, in Figs. 1 and 2, there is shown the housing 11 in which the complete assembly of the radio set is contained. A cover (not shown) is clamped to the housing 11 completely enclosing the complete radio handset assembly. Secured within the housing is a radio set (not shown) enclosed within a cover 13, having an end wall 15. As the radio set forms no part of this invention, no further description of the makeup of the radio set is believed necessary. Extending from the radio set and through the end wall 15 of the cover 13 is a flexible lead 17 terminating in an electrical connector or plug 19. Also contained within the housing 11 is a battery 21 of the dry cell type, which supplies the power for operation of the radio set. Forming part of the battery is a tubular socket 23, having therein a perforated jack portion for receiving the conductive metal prongs based within, and extending from, the plug 19.

For supporting the retaining device, hereinafter described, between the cover 13 and the battery 21 there are provided three contiguous brackets, a lower bracket 25, an intermediate bracket 27 and an upper bracket 29, said last-named bracket forming part of the retaining means as hereinafter described. Lower bracket 25 is substantially Z-shaped, having two substantially parallel arms 31 and 33 respectively, wherein the arm 31 constitutes the base of the bracket and is secured to the floor of the housing 11. The arm 33 is perpendicular to wall 15 and secured thereto by any conventional means.

Intermediate bracket 27, as bracket 25, is also secured to the end wall 15 of cover 13 by welding the end edges of the side walls of said bracket to the end wall. Bracket 27 is provided with a shelf portion, intermediate its side walls, which shelf serves as a support for a portion of bracket 29 as hereinafter described. Both of said brackets 25 and 27 are an integral part of the assembly of the handset, and serve to securely hold the cover 13.

Figure 3:
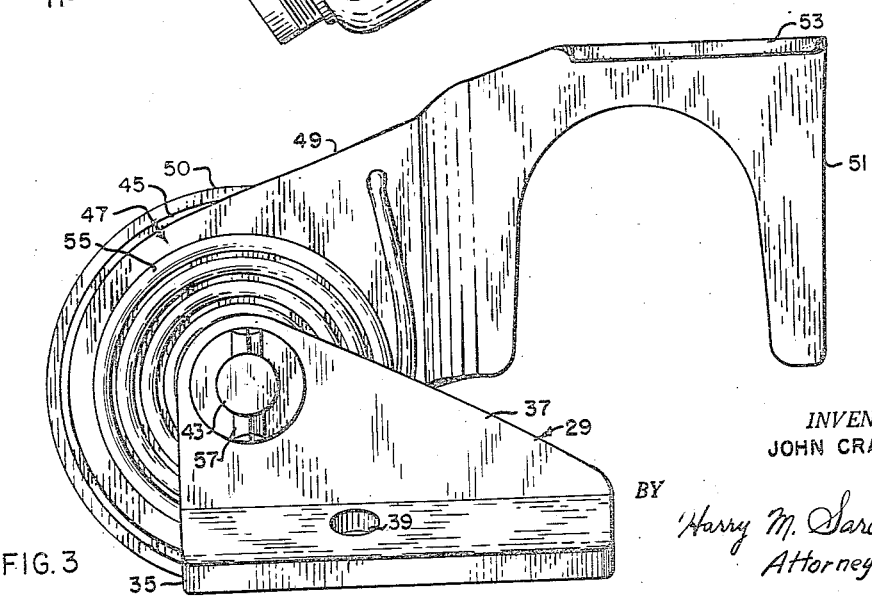
Fig. 3 is a side elevational view of the retainer alone.

The retaining device, constituting the invention herein, comprises in part the bracket 29. The bracket 29 is substantially L-shaped having a base portion 35 and a plate 37 which is substantially perpendicular to said base 35. As can be seen in Fig. 3, plate 37 is triangular in shape. Each of the brackets 25, 27 and 29 is provided with an opening, one of which is shown as 39 in the base portion 35 of upper bracket 29. All of said openings are in register to permit the insertion of a bolt 41 which serves to rigidly secure upper bracket 29 relative to the other brackets 25 and 27.

The triangular side arm 37 of the bracket 29 is provided with an opening adjacent to its apex having a pin 43 extending therethrough. To one end of the pin is secured a disc 45 which is in abutment and engagement with the battery 21 when said battery is within the housing as seen in Fig. 2. Pivotable about the pin 43 is a clamping arm 47 comprising essentially a flat-plate portion 49 and a clamping portion 51, provided with a substantially U-shaped cutout, which lies in a plane substantially parallel to and offset from the plate portion 49. Affixed to the underside of disc 45 is a pad 50, preferably made of rubber or felt which serves as a cushioning means between the battery 21 and said disc. The width of the cutout of clamping portion 51 is slightly larger than the diameter of the plug 19 of the lead 17 so that when the clamp is placed over said plug portion a tight fit is effected. The clamping portion 51 is provided with an angulated flange 53 substantially perpendicular thereto for furnishing strength and rigidity to said clamping portion.

Intermediate the bracket 29 and plate 49 is a volute spring 55 supported upon the pin 43 and which normally urges the disc 45 and plate 49 in a direction away from the bracket 29. To confine and restrain the pin from disengagement a key 57 is inserted into an opening in the pin.

In using the retaining device described above, the clamping arm 47 is first raised upwardly. The battery 21 is placed into the housing 11 by first pushing the top of the battery against the disc 45 urging the spring 55 into compression. The lower portion or bottom of the battery is then wedged into the housing. The clamping arm 47 is then pivoted whereby the gripping portion of the arm will engage and clamp the plug 19. Tension of the spring 57 will cause the disc 45 to firmly press against the battery thereby holding it securely in position. The clamping arm 47 will prevent any possibility of disengagement of the plug from the battery thus insuring that the set will be operable at all times.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an assembly comprising a first removable component and a second fixed component within a housing, means for confining said first component within said housing, comprising a disc in abutment with said first component, a pin affixed to said disc and substantially normal thereto, means rigidly affixed to said second component for supporting the free end of said pin, means intermediate said disc and said supporting means for normally urging said disc toward said first component, and a clamping arm revolvable on said pin for firmly engaging a portion of said first component.

2. In a radio set assembly comprising a housing having therein a radio set and cover therefor, a lead terminating in a tubular plug extending from said radio, and a battery, means for confining said battery within said housing comprising a disc in abutment with said battery, a pin affixed to said disc and substantially normal thereto, means rigidly affixed to said cover for supporting the free end of said pin, spring means intermediate said disc and said supporting means for urging said disc toward said battery and a clamping arm comprising a first substantially flat plate-like portion pivotable on said pin and a second portion secured to said first portion, said second portion having a substantially U-shaped cutout therein which engages the plug of said lead.

3. A device of the kind set forth in claim 1 wherein said clamping arm comprises a first substantially flat plate-like portion pivotable on said pin and a second portion joined to said first portion having a substantially U-shaped cutout therein which engages a portion of said second component.

References Cited in the file of this patent

UNITED STATES PATENTS

| | | | |
|---|---|---|---|
| 1,037,788 | Maupin | Sept. 3, | 1912 |
| 1,497,786 | Hoge | June 17, | 1924 |
| 1,666,044 | Danziger | Apr. 10, | 1928 |
| 1,989,823 | Raabe | Feb. 5, | 1935 |
| 2,426,498 | Franklin | Aug. 26, | 1947 |
| 2,439,408 | Mitchell | Apr. 13, | 1948 |
| 2,439,411 | Mitchell | Apr. 13, | 1948 |
| 2,565,523 | Russell | Aug. 28, | 1951 |
| 2,634,134 | Dietz | Apr. 7, | 1953 |